United States Patent [19]

Bennetto et al.

[11] Patent Number: 4,652,501
[45] Date of Patent: Mar. 24, 1987

[54] OPERATION OF MICROBIAL FUEL CELLS

[75] Inventors: Hugh P. Bennetto; Gerard M. Delaney; Jeremy R. Mason; John L. Stirling; Sibel Roller; Christopher F. Thurston, all of London, England; Donald R. White, Jr., Lakeland, Fla.

[73] Assignee: King's College London, London, England

[21] Appl. No.: 755,779

[22] Filed: Jul. 17, 1985

[30] Foreign Application Priority Data

Jul. 24, 1984 [GB] United Kingdom ............... 8418775

[51] Int. Cl.$^4$ .............................................. H01M 8/16
[52] U.S. Cl. ........................................ 429/2; 429/15; 429/23
[58] Field of Search .............................. 429/2, 15, 23

[56] References Cited

U.S. PATENT DOCUMENTS 3,331,705 7/1967 Davis et al. ............................. 429/2
3,542,597 11/1970 Smith et al. ........................... 429/23
3,850,695 11/1974 Keller et al. .......................... 429/23

Primary Examiner—Donald L. Walton
Attorney, Agent, or Firm—William R. Hinds

[57] ABSTRACT

In operation of a microbial fuel cell it has been found that improved efficiency results if the microbes are kept 'hungry', i.e. the cell is run under conditions of fuel supply and load such that electrical output is dependent on fuel concentration, rather than as is conventionally the case being run under excess fuel so that power output is concentration independent.

A method and apparatus are described to enable fuel cells to be run under energetic or coulombic efficiency control.

10 Claims, 8 Drawing Figures

OPERATION OF MICROBIAL FUEL CELLS

This invention relates to biochemically catalysed fuel cells for electrical power generation.

Fuel cells are devices for the direct conversion of chemical energy into electrical energy and have been known for some time. The main commercial fuel cells exploit the chemical energy released in the reaction of hydrocarbons, methanol, or hydrogen with oxygen. The main problems with such fuel cells are the high cost and limited lifetimes of the catalysts used, the corrosive nature of the electrolytes used, and the high temperature of operation of the fuel cells.

Since the early 1960's research has been in progress to develop biochemically catalysed fuel cells as these would have the advantage of operation at about room temperature, and would require much less corrosive electrolytes.

Biochemically catalysed fuel cells have been reviewed recently (L. B. Wingard et al, Enzyme Microb, Technol.(1982) 4 137) and recent work has shown the feasibility of producing electrical power from the microbial-catalysed oxidation of organic substrates (H. P. Bennetto et al Biotechnology and Bioengineering (1983) 25 559; G. M. Delaney et al J. Chem. Tech. Biotechnol. (1984) 34B 13; S. D. Roller et al J. Chem. Tech. Biotechnol.(1984) 34B, 3; and J. L. Stirling et al Biochemical Society Transactions (1983) 11, 451).

Figure 1:
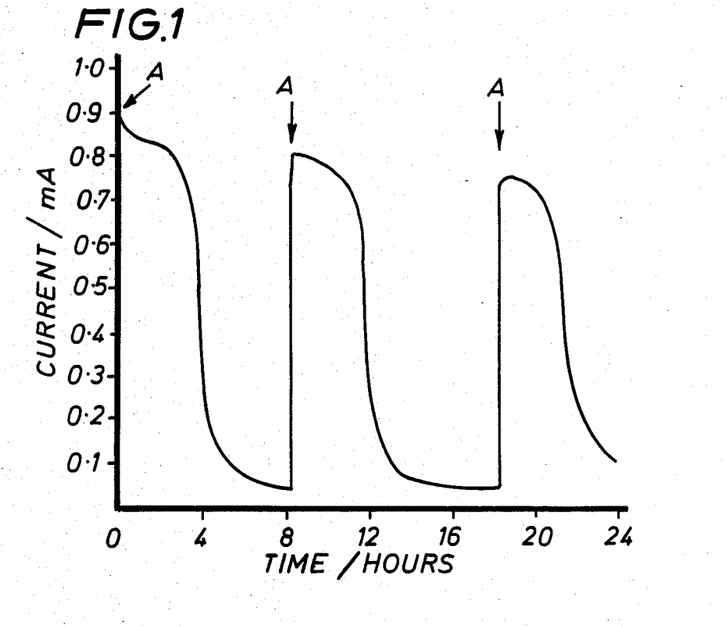
FIG. 1 is a schematic graph showing the behaviour of a fuel cell of the type described above.

These devices are capable of generating electrical energy with relatively high efficiency i.e. 40% or more of the coulombs available from the degradative oxidation of substrates can be converted to electricity (based on 100% maximum for complete conversion to water and carbon dioxide). Such high conversion factors, and the ability of the cells to deliver continuous current over long periods, depend on the inclusion of some reagent which acts as mediator in the process of transferring electrons from the biochemical source to the anode of the fuel cell. An example of behaviour observed for complete 'running down' (discharge) of the cells, and the recharging effect produced by addition of more substrate, is shown in FIG. 1 for a cell using the bacterium *Proteus vulgaris* with glucose as a fuel. The amount of electricity drawn from the cell, given by the area under the graph, is proportional to the quantity of substrate (fuel) added. Many other combinations of organism and substrate function reproducibly in this manner. Attention is drawn to the rapid regeneration of power on successive additions of fuel (as indicated at 'A' in FIG. 1) and to the voltage drop which occurs quite sharply as the system becomes substrate-limited. The organisms here lose their chemical reducing power, and fail to maintain the supply of electrons to the anode via the redox mediator.

Thus at low concentrations the cell power output is concentration dependent whereas above a threshold concentration power output is not significantly concentration dependent.

Microbial fuel cells have generally been studied under conditions where the substrate is in excess of this threshold, at least for the greater part of the experiment, and no attempts have been made to control or maintain steady-state conditions with respect to the levels of substrate concentrations or electrical output. The ability of these fuel cells to deliver current continuously over long periods has been demonstrated, however, in experiments using a strain of *Escherichia coli* with lactose as a fuel; while the parallel finding that cells running on an equivalent amount of reconstituted milk whey (5% lactose) gave a comparable performance shows the possibilities for fuel cells which utilise cheap carbohydrate and other waste materials as fuels (S. D. Roller et al, Proc. First World Conference on Commercial Applications and Implications of Biotechnology (BIOTECH '83), Online Publications, London 1983, 655). The coulombic yield in these experiments was less than 30%.

The efficiency of fuel cell operation has great economic importance in view of the various potential applications of microbial fuel cells (e.g. continuous running of small electric vehicles/boats without the necessity of recharging batteries, small power generators for remote locations not having mains electricity supplies, on-site effluent treatment and power generation in sugar refineries, dairies etc.) It is not a simple matter, however, to devise methods through which the degree of energy conversion might be maximised, either with respect to the quantity of electricity obtained (the coulombic yield) or the voltage at which it is delivered (which affects the energetic yield).

In attempting to maximise fuel cell efficiency a major requirement in normal fuel cells is that the concentration of fuel near the electrode be reasonably high since the electrochemical processes involved are concentration dependent. Low concentrations lead to various polarisation effects (see page 140 of the review by Wingard mentioned above). Accordingly there is no penalty to pay in such fuel cells from having an excess of fuel.

Contrary to these expectations the applicants have found that by operating a microbial fuel cell at low fuel concentrations an increase in coulombic and energetic efficiency is obtained.

Accordingly the present invention provides a method of controlling the operation of a microbial fuel cell by maintaining the concentration of fuel in the cell in a range for which the electrical power output of the cell is dependent on concentration, so that the efficiency of the cell is greater than it would be if the concentration of fuel in the cell was at a level for which the electrical power output of the cell was independent of concentration.

The invention further provides a microbial fuel cell controller for use in effecting the invention. This and other aspects of the invention are made clear from the claims and exemplified by the following description of trials of the invention.

In the following, reference is made to the drawings of which.

The type of fuel cell used in the tests is described in detail in Delaney et al, J. Chem. Tech. Biotechnol.

(1984) 34B 13, and comprises a pair of electrode compartments of 20 ml capacity separated by a cation-permeable ion-exchange membrane.

Fuel in the form of glucose is supplied to the anode compartment which also contains any suitable micro-organism capable of supporting a reducing action in the anode compartment. Also present in the anode compartment are the electrode which may be of carbon or some other suitable substance; and a suitable mediator (or mediators) capable of transferring electrons from the micro-organism to the electrode.

In the cathode compartment an oxidiser is required. In the tests potassium ferricyanide was used but other types of cathode may be employed such as an oxygen or air electrode.

The tests were carried out on small, single electrochemical cells producing limited voltages (up to 0.6 V) and currents (up to 30 mA) but scaling-up is possible, as is combination in series or parallel.

Figure 2:
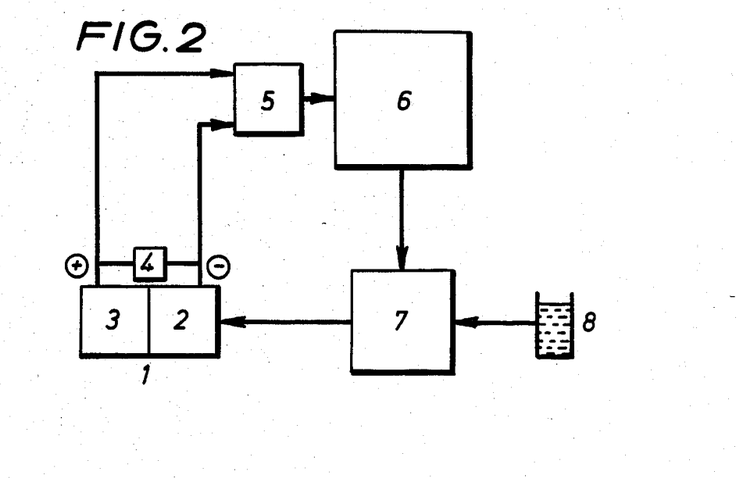
FIG. 2 is a block diagram showing the constituent components of a microbial fuel cell as used in trials.

FIG. 2 shows the arrangement used for the tests. The microbial fuel cell 1 comprises an anode compartment 2 and cathode compartment 3. Across the terminals of the cell is a load 4, in most of the tests a 100 ohm resistor was used. Voltage across the load was measured by an analogue to digital converter (ADC) 5 and transferred in digital form to a computer 6. (The ADC is an integral component of the BBC model B micro-computer used) The computer 6 was interfaced via its 8 bit I/O user port to the remote control socket of the pump 7 (Pharmacia Model P-1). The pump 7 is arranged to take fuel from a reservoir 8 and deliver to the anode compartment 2.

In the operation of the test cell, it is discharged continuously across the constant load 4 (although it could operate even with some variations in load) and the delivery of power is sustained at a constant level through regeneration with a carbon substrate fuel which is added in the form of a solution and delivered by tube from the pump 7. The rate of addition of fuel can be controlled by the length of time the pump 7 is switched on or by the speed of its operation. The self-adjusting mode of operation is achieved by feeding a voltage output signal from the cell 1 to the computer 6, which then, according to some proprammable input instruction, turns the pump 7 on or off, or adjusts its speed. 'Tuning' adjustments are easily made by altering voltage criteria in the programme; the concentration of fuel in the reservoir 8 and the pump speed can also be used to this effect. The precise conditions for maximising the stability of the system also depend on other factors, such as the mixing efficiency. (The mixing time was of the order of 5-25 seconds in our cell).

Alternatively a control mechanism for a continuous feed could be used to achieve the same effect.

We have represented the regulating device as a number of components separate from the fuel cell, but it (or parts of it) could also be miniaturised and built into the structure of the cell or the anode compartment itself. The system is programmed so that the pump is activated when the voltage (or the change of voltage with time) falls below a specified (adjustable) preset value; alternatively both these control limits may be used together. Other criteria indicative of a fall in reducing acitivity of the organisms could also be used to trigger the computer instruction, such as automatic measurement of the concentration of oxidised (or reduced) mediator from an optical absorption reading, or measurement of the rate(s) of production of some oxidation product(s) in one or both compartments of the cell (as monitored by a suitable detecting device or devices). The coulombic (or energetic) efficiency of the cell (which is continuously computed in the present apparatus) can also be used in such a way that the efficiency itself is maximised.

Figure 6:
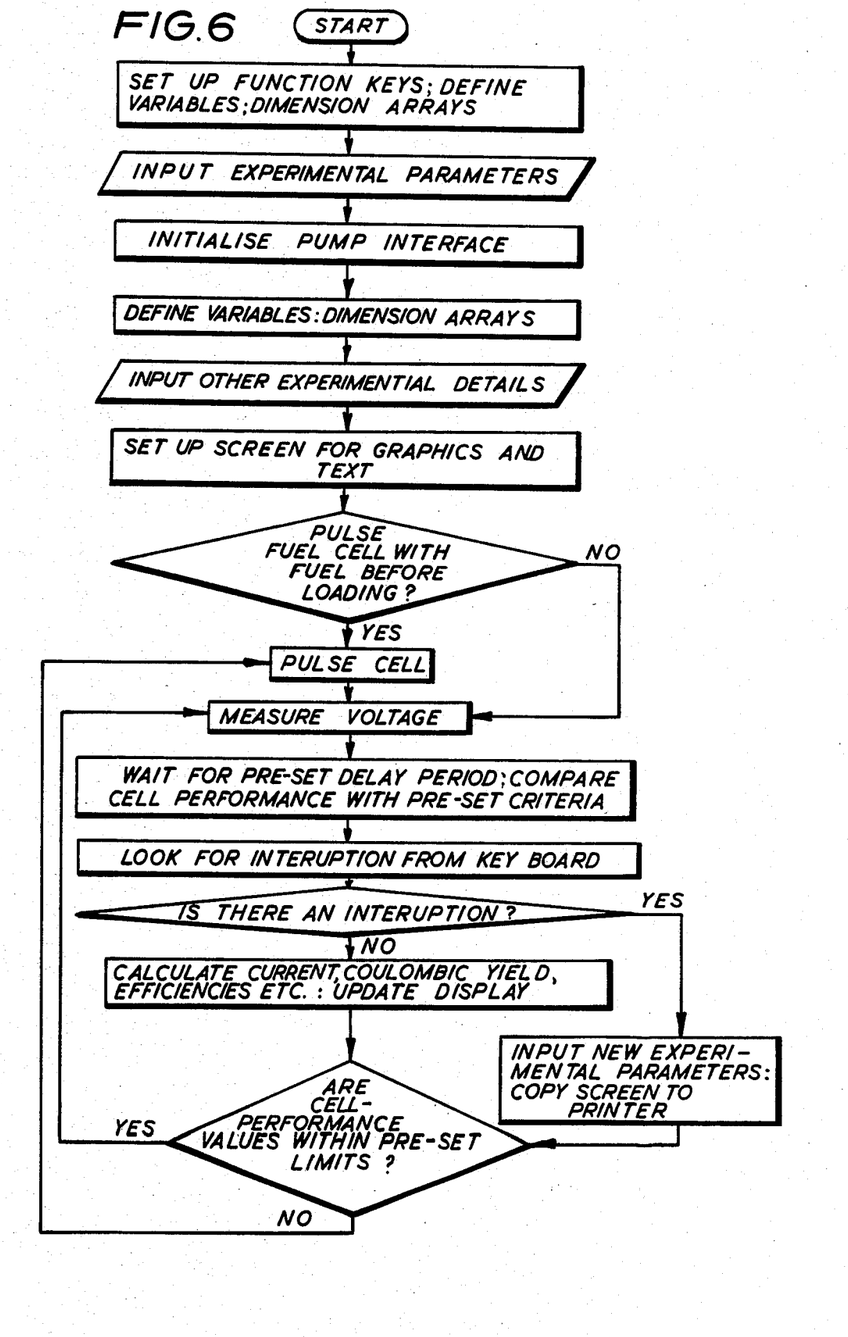
FIG. 6 is a flow diagram of a computer programme used in the tests.

A flow diagram of the program used in the tests forms FIG. 6.

EXAMPLE 1

Figure 3:
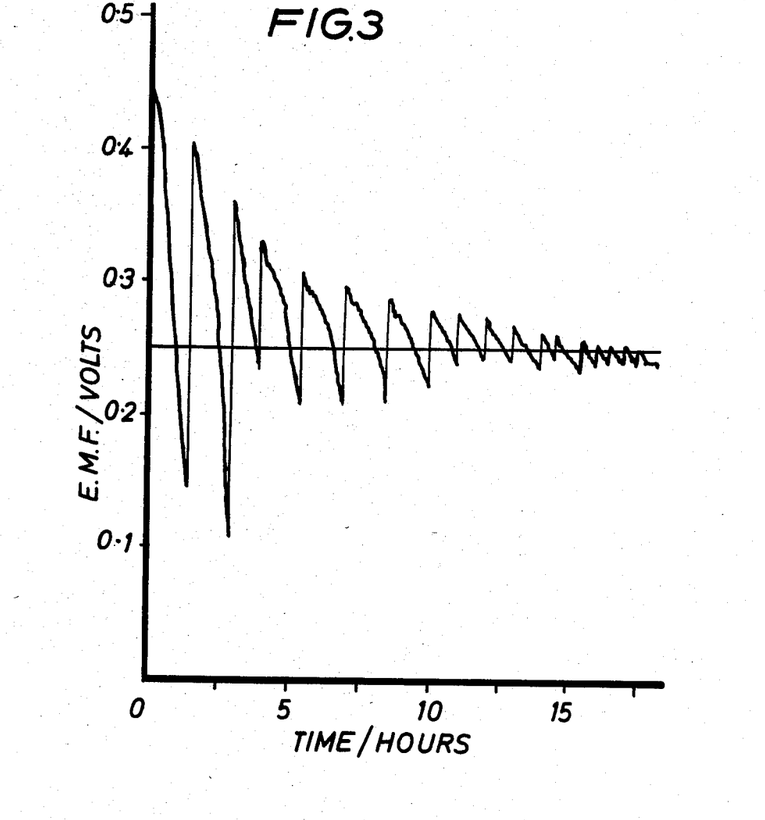
FIG. 3 is a graph of cell voltage v time for a microbial fuel cell operated under coarse control as described below.
Figure 4A:
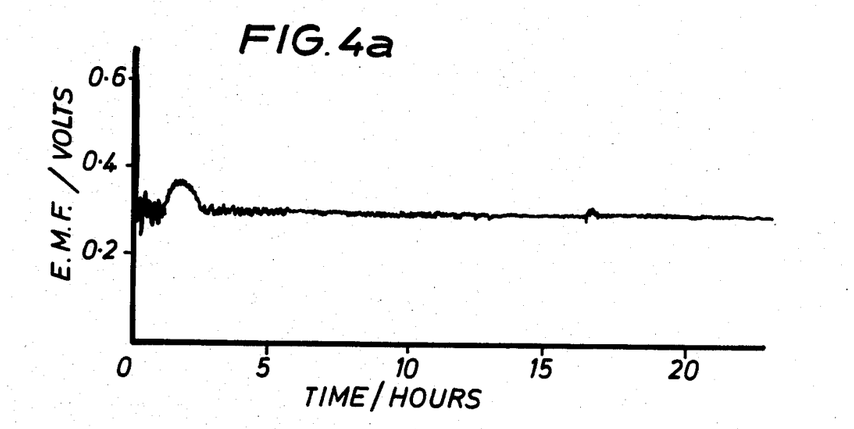
FIGS. 4a, 4b and 4c are graphs of cell voltage v time for various microbial fuel cells operated in accordance with the method of the invention.
Figure 4B:
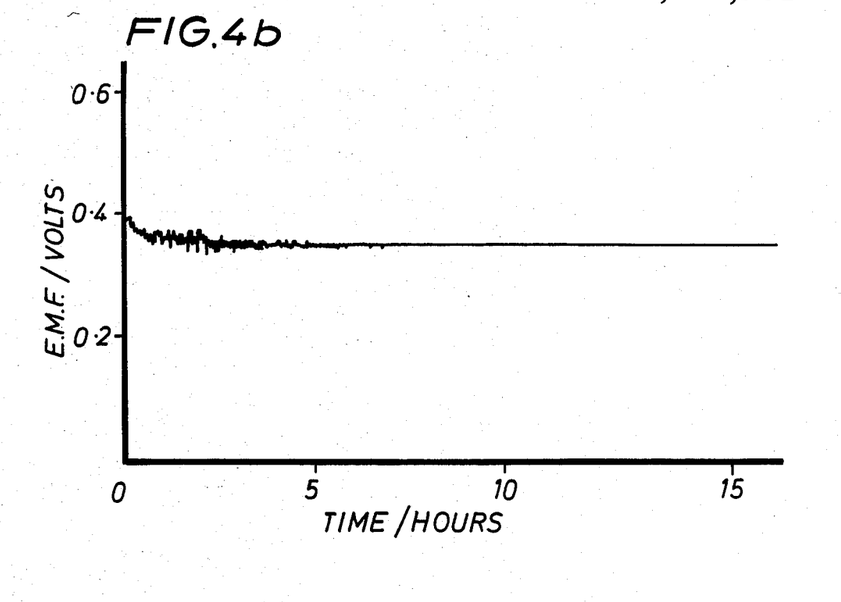
Figure 4C:
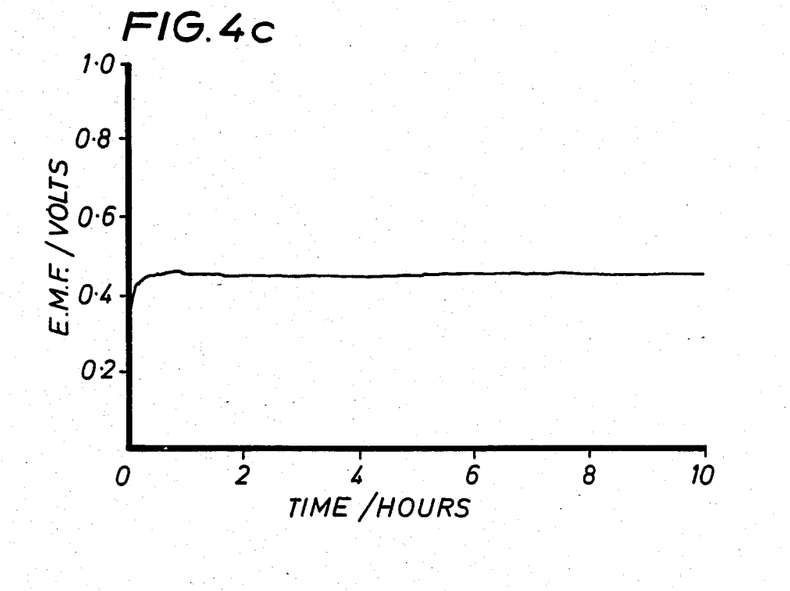

The bacterium *Proteus vulgaris* B11 (NCTC 10020) from the culture collection of the Microbiology Department, Queen Elizabeth College was used. The experimental temperature was 30° C., although other temperatures could be employed, provided that the organisms remain both stable and active. Discharge was across a 100 ohm resistor, so that on the figure a 0.5 V e.m.f. reading represents 5 mA current. Other details were as listed in the figure or as described elsewhere (Delaney et al., 1984). FIGS. 3 and 4 give actual data obtained by direct output from the computer-stored data via a digital printer.

One type of behaviour, shown in FIG. 3, was observed when only a coarse control method was applied. In this case the pump was activated when the volts signal fell below a designated critical value (0.25 V), but the quantity of substrate delivered from a pre-programmed pulse (10 micromoles=2 mg approx.) was such that the substrate remained in excess in the fuel cell anolyte solution at an initial concentration of the order of 5-10 millimoles dm$^{-3}$, resulting as shown in a rise of voltage above the critical value. This was sustained for some time, but eventually collapsed. Over a long period of operation, an oscillating output resulted, with a pulse interval of 30 minutes or more. This contrasted with the result shown in FIG. 4a obtained when the quantity of glucose in each addition of feed solution was extremely small (0.1 micromoles,=0.02 mg approx.), delivered with a pulse interval of about 30 seconds. The regeneration effect worked in such a way that the rapid utilisation of the small amounts of fuel added tended to give a rapid collapse in the output. This was immediately countered, however, by further automated pulses, so that the net result was a steady output at or close to the preset voltage, which could be maintained over long periods as shown. The upper limits of concentration of free glucose in the anolyte were in this case of the order of 10 micromolar.

The automated method of operation has the advantage that it is not limited to running at a particular setting; current, voltage, and/or other parameters can be set as to suit a required purpose or application. The result shown in FIG. 4b, for example, was obtained under conditions similar to those used for results as shown in FIG. 4a (100 ohm load), but the computer was programmed for the higher critical e.m.f. value of 0.35 V.

The method is not limited to a particular substrate fuel. Thus, whereas the results shown in FIGS. 4a and 4b were obtained using glucose as fuel, the comparable result illustrated in FIG. 4c was obtained with sucrose. Diluted molasses and other impure forms of carbohydrate may be used to advantage.

In the trials the cumulative coulombic output and coulombic yields were monitored taking account of the successive cumulative substrate additions. For very long runs (10-24 hours) the conversion of substrate yielded hundreds of coulombs of electricity, and contributions to the yield from the conversion of endogenous substrate, i.e. oxidisable stores of energy residing within the micro-organisms (which were known from independent measurements to be no more than a few coulombs for the quantities of organisms used, 50 mg 'dry wt.') are negligibly small in the calculation of yields.

The electrical yields for cells run at continuous steady currents under conditions of low substrate concentration were substantially higher than those obtained in other cases where excess of glucose was present.

Thus in experiments using glucose as a fuel and thionine as mediator, such as illustrated in FIG. 4a under conditions of low substrate concentration, the yield was of the order of 60%, compared with a value of about 45% typical of comparable cells using the same organism which are discharged in the presence of a large excess of substrate from one large initial 'feeding' without the advantage of the automatically adjusted feed (Delaney et al., 1984). The lower figure was also obtained when the automated feed was coarsely adjusted as in FIG. 3. Detailed figures are presented in Table 1, from which it can be seen that the increase in yield obtained with our method is around 32%.

The use of the computer to collect and process the experimental voltages and currents allowed a precise calculation of the total energy yielded by the cells, from which the effects of operating conditions on the thermodynamic efficiency can be assessed. From the figures in Table 1 it may be seen that the electrical energy yield, as well as the coulombic yield, is raised when the cell is run under low substrate-level conditions; the increase is 42%.

This increase is independent of any standard against which one might measure the thermodynamic efficiency of the cells. In Table 1 are compared the energy outputs using the standard free energy of oxidation of glucose by ferricyanide, 1.83J per micromole, which can be calculated unequivocally from standard free energies or electrode potentials. (The standard free energy for oxidation of glucose by oxygen would be appropriate for an oxygen cathode). Efficiencies are higher using the standard electrode potentials appropriate to the experimental cell, i.e. for the thionine and ferricyanide/ferrocyanide couples (0.06 V and 0.36 V and pH 7); the theoretical maximum voltage would be around 0.3 V, and the energetic efficiency (cell B, Table 1, operated at 0.3 V) would be similar to the coulombic efficiency, i.e. 61%, but the precise calculation of the theoretical maximum energy is complex, since both the anode and cathode are operating as redox half-cells under non-standard conditions. Energetic losses which occur in the reduction reaction for transfer of electrons to the mediator could be reduced by using a mediator of more negative standard potential. Other small losses from polarisation effects are inevitably incurred (Wingard et al 1982), but these can be reduced by the use of electrodes having a greater surface area, and by the use of higher concentrations of organism and mediator.

EXAMPLE 2

The yields obtainable from microbial fuel cells depend somewhat on the particular electron-carrier used. The experiments described above used thionine, a very effective redox mediator (Delaney et at., 1984). Another mediator which works well in the fuel cells, but usually allows a more-limited degree of conversion of fuel, is 2-hydroxyl-1, 4-naphthoquinone (HNQ). Experiments similar to those described above were conducted in which thionine was replaced by HNQ. The coulombic yield for 'substrate in excess' conditions was about 25%, whereas the low-substrate fuel cells gave 44%. Thus, although the yields are numerically lower than those obtained using thionine, there is again a substantial increase, in this case amounting to 76%. The corresponding increase in the energetic yield was 62%.

The computer-controlled experiments described above allowed close approximation of the conditions to a continuous feed at very low substrate concentrations. Further evidence to support the findings comes from other experiments in which were used a truly continuous feed given by a pumping rate carefully fixed such as to provide the required limiting concentrations. Such a system cannot operate at high efficiency for very long periods under unvarying conditions (or output) without any mechanism for self-adjustment, but was sufficient to provide results showing that the effect of efficient utilisation of fuel is not dependent on the particular method of control, and that the on-off action provided in the automatic set-up, for instance, is not the determining feature.

In one set of experiments (set A) two identical fuel cells were evenly and continuously fed a total of 10 micromoles of glucose over 2.5 hours; the yields, appropriately corrected for endogenous activity determined in parallel experiments (Bennetto et al., 1983; Delaney et al., 1984) were 11.3 and 11.8 coulombs (48.8% and 50.9% respectively, which agreement gives some indication of the reproducibility of the measurements). The corresponding yields from a matching set of experiments in which a single feed of glucose was given were 7.16 and 7.05 coulombs (31.0% and 30.4%). The average increase in coulombic yield for the 'continuous feed' cells over the 'single feed' cells was 62.4%. In further experiments using organisms from the same batch but where the amount of glucose was increased to 20 micromoles, the yield for a single feed was 33.5% compared with 54.9% for a continuously fed system, an increase of 63.9%.

All of the experiments in set A were with organisms grown in a defined medium with glucose added (Roller et al., 1984). In another set of experiments (set B) organisms grown differently on nutrient broth with added glucose were used. In this case the yields were 45.1% (single feed) and 66.6% (continuous feed)giving an increase of 47.7%. Thus, we see that although the absolute values of the yields may vary depending on the method of preparation of organisms, there is always a significant relative increase for very low substrate conditions.

Increases in the energetic outputs of over 20% were also recorded for such experiments (sets A and B) under constant feed (low-substrate) conditions.

Results such as given in the above examples substantiate the claim that a microbial fuel cell operated under very low substrate conditions produces much more electricity (coulombs) and more electrical energy (joules) than one operated under conditions of permanent or variable excesses of substrate.

In previous work on microbial fuel cells, examples of continuous electricity production at constant or near-constant currents have been cited (Bennetto et al., 1983; Roller et al., 1984). These steady outputs could be obtained at high or low currents/voltages depending on the value of the load resistance used. For those experiments, however, it should be noted that (a) a relatively large excess of substrate was added at the start, and the cells must have contained a considerable excess over most of the period during which current was drawn; (b) the yields typically obtained were similar to those (mentioned above) for single-feed experiments, and lower than obtained by the improved method of operation. From this it may be deduced that it is not just the maintenance of a smooth constant output from the cells which is responsible for the high efficiency.

A steady output of power has obvious practical advantages. Indeed, it is a common characteristic of most conventional sources, which also require no sensitive adjustment mechanisms for their operation. It might have been deduced that microbial fuel cells such as those studied in earlier work, which give an easily controlled output level, would operate as efficiently as those operating at low substrate level. But this is not the case. Relatively low yields are obtained in experiments where the pulse had an 'infinite' value (large single-pulse feed, giving large excess of substrate) and also in experiments where frequent long pulses were used (as illustrated in FIG. 3), even though some constancy of current was eventually achieved in the latter case. (This appears to result from progressively less efficient working of the system). In the automated method of operation the use of frequent short pulses, together with judicious choice of voltage (and/or voltage slope) settings, pump speed, etc., can be used to give constant output over a range of currents/voltages within the limits of the cell e.m.f. and depending on the experimental conditions. In the examples so far presented not all of these settngs will lead to the most efficient usage of fuel, but adjustments can be easily and rapidly made, and the result of an adjustment (e.g. on the coulombic efficiency) can be continuously monitored. The result can then be used as a criterion for further adjustments, and the efficiency can be optimised as required.

Figure 5:
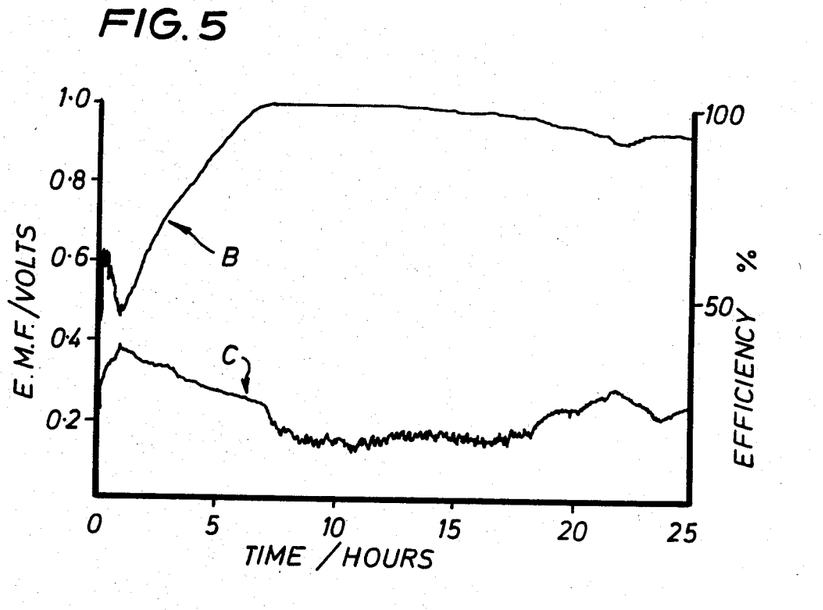
FIG. 5 is a graph of both coulombic efficiency and electrical output for the fuel cell of FIG. 4a run under coulombic efficiency control.

A computed parameter such as coulombic efficiency can also be used to provide an automatic 'feedback' of information to the substrate-feed system itself, thereby giving a self-optimising system. In one set of experiments the criterion used for fuel-injection was the coulombic efficiency of the cell (i.e. the % conversion of the substrate-fuel to carbon dioxide and water, as calculated from the monitored output of current in relation to the fuel input). A typical result is shown in FIG. 5, where the experimental conditions were identical to those cited earlier (example shown in FIG. 4a). After a period of initial adjustment, the system was set to operate such that the coulombic efficiency (indicated by curve 'B' in FIG. 5) was maximised. Thereupon the value rose steadily to achieve a maximum of around 100%, which value could be maintained over many hours. Some compensating loss in the energy of electrical output results (indicated by curve 'C' in FIG. 5) since the voltage and current both fall, but a definite and useful amount of electricity is nevertheless produced (0.2 V, 2 mA). Adjustments in the programming made at 18, 22 and 24 hours confirmed that the % efficiency and electrical output are interdependent.

Such a mode of operation, in which a very high utilisation of fuel can be maintained, can be used to advantage in applications such as effluent treatment. The BOD (bulk oxygen demand) of a carbohydrate-containing solution can be usefully reduced to a level which does not contravene regulations for disposal of waste fluids, such as apply in the food industry and elsewhere.

From theoretical grounds (the Nernst equation) the output of the cell is likely to be more stable, and the electron transfer processes involved are likely to be more efficient, in the cell voltage region which corresponds to an anode potential 0.06 V above or below the mid-point potential for the mediator which provides a single-electron transfer reaction. In this region the ratio of concentration of the oxidised form of mediator to that of the reduced form is not too far from unity, and the rates of the respective reactions of these forms with the micro-organisms and the anode respectively are not unduly limited by concentration effects. If the loading is too heavy, the electricity-generating capacity of the system will be limiting, and the cell will become highly polarised. If the loading of the system is such, however, that electrons are drawn off to the outside circuit much more slowly than they are provided by the organisms, then the concentration of oxidised mediator falls and the drain on the microbial electricity (and consequently the substrate fuel) is insufficient to prevent accumulation of excess substrate. Under these conditions, excess of oxidisable material is available to be diverted into other biocatalysed reactions, at the expense of providing reducing power to the mediator system and thence the anode.

Clearly there is some intermediate condition or set of conditions which is favourable for optimising yields. The ideas outlined above are the basis of some rationalisation of our observation that a finely-balanced near-continuous throughput of electrons gives an increased yield of electricity. Such a result could never have been predicted with any confidence, however, and could not be easily realised in a practical sense without the use of a device such as described.

It may be pointed out that the type of behaviour observed in the experiments described above appears to contrast uniquely with that of ordinary fuel cells. A normal requirement for efficient use of fuels in a fuel cell is a reasonably high concentration of fuel near the electrode, since the electrochemical rate processes involved are concentration-dependent, and low concentrations therefore lead to various polarisation effects (Wingard et al., 1982). Some similar kind of concentration dependence for a microbial fuel cell might also have been expected. In the new method of operating the cell there exist low-level substrate conditions which, in conventional terms, should limit the performance and efficiency of the cell as the concentration is decreased, but in fact precisely the opposite effect of substantially increased coulombic and energetic efficiency is achieved. Though this is a surprising result which has not been anticipated by any previous study and could not have been easily predicted, one can attempt a phenomenological explanation in the following terms. Because of the effectiveness of the uptake of fuel by the organisms and of the subsequent bio-catalytic degradation reactions inside the biological cells, the electrons from oxidation of fuel can be efficiently extracted from the substrate and 'pooled' within the bacterial cells, where they are available for 'tapping off' by a mediator. The reducing power of the organism resides in the 'pool' and the redox ratio of the mediator is divorced to some extent from the substrate concentration. It appears that at very low concentrations the organisms might be even more receptive to uptake of substrate through the operation of some mechanistic facility depending on the biochemistry or microbial physiology of the organism; when the organisms are 'hungry', they open wide their 'mouths'! Alternatively, or in addition to this effect, there may be inhibitions to the uptake of substrate which come into play as the conditions are changed to excess of substrate and limitations caused by inability of the organism to replenish essential biochemical components. In addition to these factors, the organisms may use other metabolic pathways in the presence of excess substrate which are less favourable for the scavenging of electrons in the fuel cells. Even if it be claimed that such possibilities were foreseeable in the light of existing knowledge of microbial biochemistry, it could hardly be suggested that they could lead to a greatly increased yield under the conditions described or that this increase is susceptible to controlled application as is evident for the device of the present invention.

The improved operation of the cells can also be used to advantage in devices for efficient intermittent utilisation of fuel in certain types of application. Thus if the voltage criterion for switching on the feed is suitably set, the power source is 'fed' with substrate fuel until it becomes charged up, but no further fuel is then delivered because the power is 'off'; there is no load upon the cell, and the voltage does not therefore fall appreciably with time in the 'inactive' state. The power and energy capacity of the cell will obviously depend on the capacity of the mediator system and on the physical and electrochemical characteristics (e.g. size, type of electrode, as with any other type of battery or fuel cell). Here the particular novelty and advantage of the self-fed cell, however, is that it charges itself up fully, but no excess of active fuel is left in the anolyte. This makes for more efficient use of the fuel, which can be kept in a separate reservoir as a relatively stable concentrate, since (a) it is not available for fermentation or other bio-degradation reactions in that part of the system containing the biological component (and it is therefore also possible to limit the accumulation of undesirable waste-products which might shorten the working lifetime of the anode system); (b) it is not so susceptible to ordinary chemical decomposition reactions, such as hydrolysis (which might be an important factor for cells containing organisms in bio-anodes which require the use of acid or alkaline conditions), and (c) the fouling or poisoning of the electrode, or the increase of cell or activation resistance and polarisation (see Wingard et al., 1982) by large concentrations of substrates. Such a device may find use, for example, in the operation of door-bells or alarm systems, or, on a bigger scale, in electrically-powered vehicles. In the latter case the system provides two types of voltage criterion (or selectively variable criteria) appropriate for 'recharge' or 'run' modes of operation.

The improved fuel cell method can be used for many applications such as described using many types of organism and a wide range of fuels, in purified or natural form. For example, sucrose or impure sucrose molasses from either cane or beet can be used with *Proteus vulgaris* or any organism grown in the presence of and able to metabolise sucrose. Lactose, lactose in milk whey, or lactose molasses can be used with appropriate strains of *E.coli.* Hydrocarbons or oils, e.g. shale oil, can be used with suitable organisms.

Such cells can be put to use for power generation or for treatment of waste waters, e.g. in refineries. Particular advantages are that (a) the systems can work in very dilute solutions (which is often a problem for other methods), and (b) in dilute solutions the extraction/energy conversion becomes more efficient.

TABLE 1

| | Coarse | Fine |
|---|---|---|
| Glucose concentration (reservoir solution)/ millimoles dm$^{-3}$ | 76.4 | 10.0 |
| Glucose per pulse/ micromoles | 10 | 0.1 |
| Pulse interval | 30 min or more | 30 sec. or more |
| Pre-set voltage threshold | 0.25 V | 0.3 V |
| Pre-set voltage slope threshold | none | pulse delivered when voltage falls more than 1.0 mV per minute |
| Duration of run/hr | 19.5 | 23.0 |
| Total glucose/micromoles | 180 | 174 |
| Total electrical yield/ coulombs | 192.0 | 245.2 |
| % yield (coulombic) | 46.0 | 60.8 |
| Total energy yield/joules | 52.6 | 74.5 |
| % yield (energetic) | 16.9 | 24.8 |

What is claimed is;

1. A method of controlling the operation of a microbial fuel cell by maintaining the concentration of fuel in the cell in a range for which the electrical power output of the cell is dependent on concentration, so that the efficiency of the cell is greater than it would be if the concentration of fuel in the cell was at a level for which the electrical power output of the cell was not significantly dependent on concentration.

2. A method as claimed in claim 1 in which the method comprises the steps of:
   (i) monitoring the concentration of fuel in the cell by any suitable means; and
   (ii) adding further fuel as necessary and in such amounts as to maintain the concentration of fuel in the cell in the range for which power output is dependent on concentration.

3. A method as claimed in claim 2 in which the amounts added are small enough that the electrical power output of the cell remains substantially constant.

4. A method as claimed in claim 2 in which the monitoring of fuel concentration is achieved by monitoring the electrical power output of the cell.

5. A method as claimed in claim 1 in which the efficiency of the cell is calculated continuously or from time to time and is used as a criterion in deciding whether or not to add further fuel.

6. A microbial fuel cell controller comprising:
   sensing means, control means, and fuel delivery means, in operation the sensing means providing to the control means an indication of cell fuel concentration,
   the control means operating on said indication in accordance with predetermined criteria to determine whether addition of further fuel is necessary, and if so the control means supplying a signal to the delivery means to add further fuel,
   the control means ensuring that fuel concentration remains in a range for which the power output of the cell is dependent on concentration.

7. A microbial fuel cell controller as claimed in claim 6 in which the sensing means comprise means to monitor the electrical output of the cell, the control means can calculate from the electrical output and the amount of fuel added the efficiency of the microbial fuel cell, and in which the predetermined criteria are directed to optimising the efficiency of the fuel cell.

8. A method as claimed in claim 2 in which the efficiency of the cell is calculated continuously or form time to time and is used as a criterion in deciding whether or not to add further fuel.

9. A method as claimed in claim 3 in which the efficiency of the cell is calculated continuously or from time to time and is used as a criterion in deciding whether or not to add further fuel.

10. A method as claimed in claim 4 in which the efficiency of the cell is calculated continuously or from time to time and is used as a criterion in deciding whether or not to add further fuel.

* * * * *